UNITED STATES PATENT OFFICE.

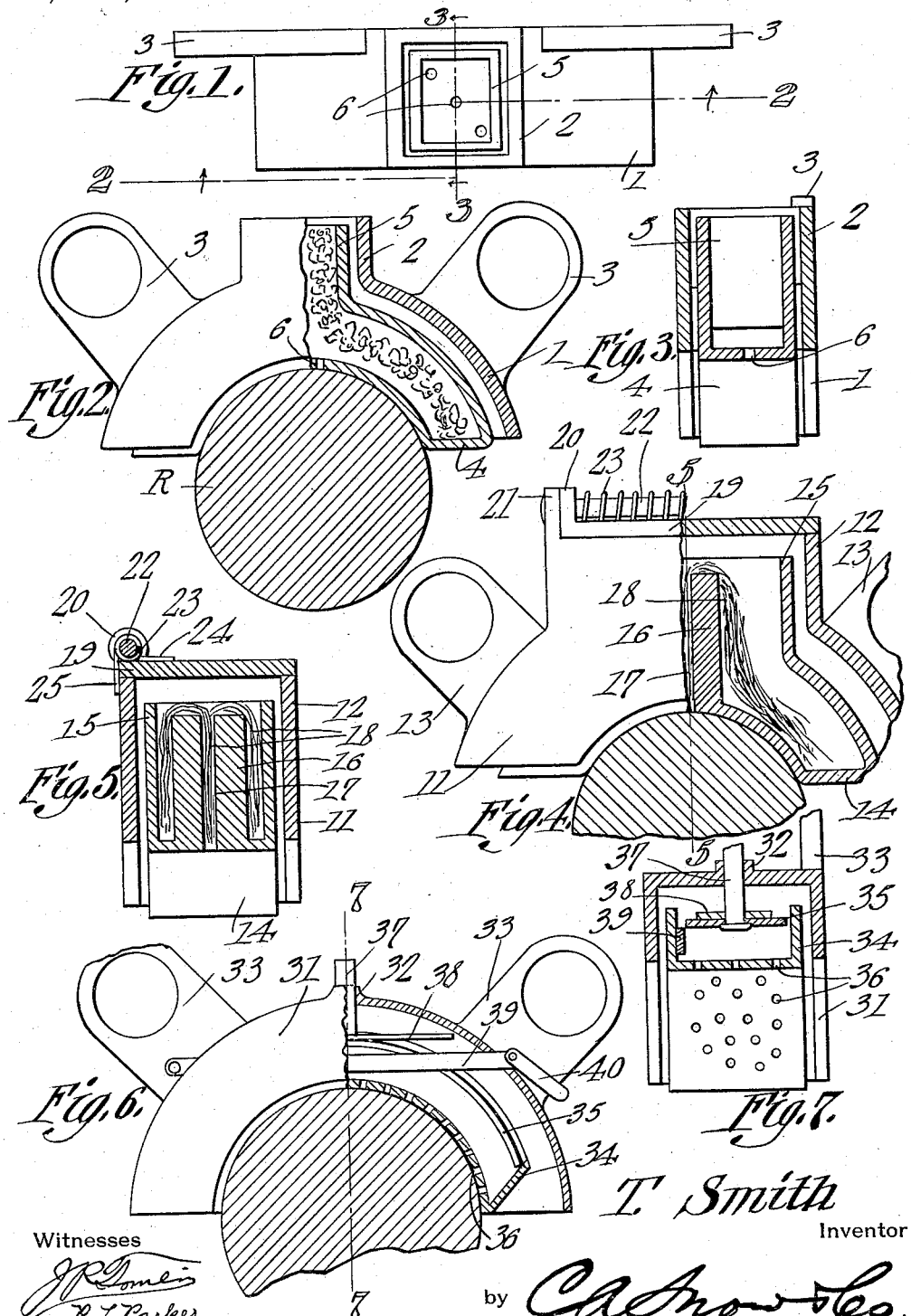

THOMAS SMITH, OF MEADVILLE, PENNSYLVANIA.

PISTON-ROD LUBRICATOR.

1,174,096.

Specification of Letters Patent.

Patented Mar. 7, 1916.

Application filed October 11, 1915. Serial No. 55,286.

*To all whom it may concern:*

Be it known that I, THOMAS SMITH, a citizen of the United States, residing at Meadville, in the county of Crawford and State of Pennsylvania, have invented a new and useful Piston-Rod Lubricator, of which the following is a specification.

The present invention appertains to lubricators, and relates more especially to a lubricator for lubricating a piston rod, valve stem or other equivalent reciprocatory member.

The object of the invention is the provision of a lubricator to adequately meet the requirements for lubricating the piston rods or stems on locomotive, marine, stationary and other engines or machines, and is especially adapted for use on the piston rods of locomotives.

Another object of the invention, is the provision of a lubricator that will adjust itself to accommodate the irregular movements of the rod, due to the up and down wear, side motion of the cross head, or the like.

A still further object of the invention is to provide a lubricator that will thoroughly lubricate the piston rod or stem without the use of a swab composed of cotton or other fibrous material encircling or embracing the rod. These swabs which are ordinarily used, cause a great deal of trouble, because when the swabs become worn, they unravel and the threads pull into the packing rings of the metallic packing, and thereby cause a leakage or blow. To remedy the objections incident to the use of ordinary swabs, it has been attempted to use such materials which will not unravel so easily, but it is found that this is objectionable since it takes the gloss off of the piston rod, and becomes hard, so that the oil or lubricant will not pass through it. This would allow the piston rod to become dry, which is a dangerous condition. Swabs also require frequent renewal and waste the lubricant, while the present invention eliminates both of these objections.

It is also within the scope of the invention to provide a piston rod lubricator which is exceedingly simple, compact and inexpensive in construction, which may be readily applied to various piston heads, glands, and the like, to coöperate with the piston rod, and which will be thoroughly practical and efficient in use.

With the foregoing and other objects in view which will appear as the description proceeds, the invention resides in the combination and arrangement of parts and in the details of construction hereinafter described and claimed, it being understood that changes in the precise embodiment of the invention herein disclosed can be made within the scope of what is claimed without departing from the spirit of the invention.

The invention is illustrated in the accompanying drawing, wherein:—

Figure 1 is a plan view of one form of the invention. Figs. 2 and 3 are sectional views taken on the lines 2—2 and 3—3, respectively, of Fig. 1. Fig. 4 is a view of the second form of the invention, partly in elevation and partly in section. Fig. 5 is a sectional view taken on the line 5—5 of Fig. 4. Fig. 6 is a view similar to Fig. 4 of another modification. Fig. 7 is a sectional view taken on the line 7—7 of Fig. 6.

Referring specifically to Figs. 1, 2 and 3, wherein the most simple form of the invention is illustrated, there is illustrated an arcuate or arched channel-shaped housing 1, preferably in the form of a casting, and having its ends open. This housing 1 is disposed astride the piston rod R, but the flanges of the housing 1 which project toward said rod are spaced sufficiently from said rod so as not to contact therewith. The hood 1 is provided intermediate its ends or at its crest with an upstanding mouth 2. The housing 1 is also provided with one or more apertured ears 3, preferably flush with one flange thereof, whereby said ears can be bolted or otherwise fastened to a cylinder head, gland, or other support, to hold the housing in place astride the piston rod, stem, or other part to be lubricated. Disposed loosely within the housing 1 is an arcuate or arched receptacle 4 adapted to fit loosely or snugly astride the upper surface of the piston rod. The receptacle 4 is provided intermediate its ends or at its crest with an upstanding mouth 5 projecting loosely within the mouth 2 of the housing. The receptacle 4 is movable in various directions within the housing, so that the receptacle can adjust itself to the position of the piston rod. The bottom or inner curved wall of the receptacle 4 is provided between its ends with one or more apertures 6 to permit the lubricant which is contained within the receptacle 4 to flow through said apertures onto the piston rod for lubricating the same. The receptacle 4 is preferably filled with loose cotton waste or other absorbent material, whereby the lubricant will be conveyed by capillary attraction from the limbs or end portions of the receptacle 4 to the apertures 6. It will be noted that the lubricant receptacle in seating upon the piston rod, will cause the piston rod to close the apertures 6, and this will prevent the discharge of lubricant when the piston rod is at a standstill, but when the piston rod reciprocates, new portions thereof are exposed below the apertures 6, and this will draw or suck the lubricant from the receptacle. The lubricant will therefore flow from the receptacle onto the piston rod as long as the piston rod reciprocates, but as soon as the piston rod stops, the flow of lubricant will be checked up. This effects a saving, since the lubricant is not wasted. If desired, the portions 2 or 5 can be provided with a cover or cap to exclude dust and extraneous matter. The mouth 5 of the receptacle fitting within the mouth 2 of the housing prevents the receptacle from rotating out of proper position upon the piston rod, and the lubricant may be readily poured into the receptacle 4 through the mouth 5 thereof.

Figs. 4 and 5 illustrate a somewhat similar structure, which, however, has differences in its details. This form of the invention embodies a housing 11 similar to the housing 1, having an upstanding mouth portion 12 and attaching ears 13. An arcuate receptacle 14 is disposed loosely within the housing 11 and has an upstanding mouth portion 15 fitting loosely within the portion 12 to prevent the receptacle 14 from rotating out of place. The bottom or inner curved wall of the receptacle 14 is provided between its ends with an upstanding stud 16 projecting into the mouth portion 15, and provided with a vertical bore 17 therethrough and leading to the upper surface of the piston rod. A wick 18 of any suitable material is passed downwardly into the bore 17, and passes over the upper end of the stud 16 so as to hang down the sides thereof within the receptacle. This wick 18 will conduct the lubricant from within the limbs of the receptacle upwardly into the bore 17 and thence down said bore to the piston rod. If desired, the stud 16 can be eliminated, in which event the receptacle is filled with a loose absorbent material, such as hair, to carry the lubricant to the aperture or bore. The mouth portion 12 of the housing 11 is closed ordinarily by a cover 19, which excludes dust and other extraneous matter, the cover 19 being provided with a pair of ears 20 overlapping a pair of ears 21 with which the portion 12 is provided adjacent one wall thereof. A pin or other pivotal element 22 is engaged through the ears 20—21, to hinge the cover in place, whereby it can be swung open upwardly. A coiled wire torsional spring 23 surrounds the rivet or pin 22 and one end 24 of the spring bears upon the cover 18, while the other end 25 of the spring bears against the respective end of the portion 12, so that the spring swings the cover closed. The spring can be eliminated, if preferred.

Figs. 6 and 7 illustrate another form of the invention, which is of somewhat different type, although it embodies the general features of the two forms above described. In this variation, there is provided an arcuate or arched hood 31 of channel-shape having its ends open and provided at its crest with an aperture 32. The hood 31 also has apertured ears 33 for attaching it to the cylinder head, gland, or other support. Disposed loosely within the hood 31 is an arcuate or arched channel or trough-shaped receptacle 34 having its ends closed, and adapted to fit snugly upon the piston rod. The bottom of the receptacle 34 is provided with suitably arranged apertures 36 and the receptacle 34 is adapted to hold grease or similar thick lubricant, while the receptacles 4 and 14 above described are adapted especially for holding oil or other thin lubricant. An arcuate or arched plate 35 is disposed within the mouth of the receptacle 34, for pressing the grease or lubricant through the apertures 36 onto the piston rod, and an upstanding pin 37 is riveted or otherwise secured to the intermediate portion of the plate 35 and passes slidably through the aperture 32. A leaf spring 38 is secured between its ends to the pin 37 upon the intermediate portion of the plate 35, and the end portions of the spring 38 tend to spring upwardly, and bear against the top of the hood 31 to thereby press the plate 35 downwardly to force the lubricant through the apertures 36. In this manner, the lubricant is gradually fed through the apertures 36 onto the piston rod as the lubricant upon the piston rod vanishes. A retaining bar 39 is slid through suitable apertures provided in the curved wall of the hood 31 in a chordal position and extends through the receptacle 34 adjacent one flange or side wall thereof, for holding said receptacle in place within the hood. The bar 39 has a pivoted finger piece or handle 40, at one end, which can be grasped for withdrawing the bar 39. When the bar 39 is withdrawn, the pin 37 can be raised to retract the plate 35 from the receptacle 34, and said receptacle can then be turned or rotated to move out of the housing 31. This allows the receptacle to be removed without detaching the housing, so that the receptacle can be refilled and then reapplied to the housing and piston rod easily.

From the foregoing, taken in connection with the drawing, the advantages and attributes of the invention are thought to be obvious to those versed in the art.

Having thus described the invention, what is claimed as new is:

1. A lubricator for piston rods, valve stems, and the like, embodying a housing, and an arcuate lubricant receptacle disposed loosely therein and adapted to fit a piston rod, valve stem or equivalent member, said receptacle having an aperture to allow the lubricant to pass onto the piston rod, valve stem or other member.

2. A lubricator for piston rods, valve stems, and the like, embodying a housing, an arcuate lubricant receptacle disposed loosely therein and adapted to fit a piston rod, valve stem or equivalent member, said receptacle having an aperture to allow the lubricant to pass onto the piston rod, valve stem or other member, and the housing and receptacle having coöperating means whereby the receptacle is held properly within the housing.

3. A lubricator for piston rods, valve stems and the like, embodying an arcuate channel-shaped housing having its ends open, and an arcuate lubricant receptacle disposed loosely within the housing and adapted to fit a piston rod, valve stem, or the like, the receptacle having an aperture to allow the lubricant to flow onto the piston rod, valve stem, or the like.

4. A lubricator for piston rods, valve stems and the like, embodying an arcuate channel-shaped housing having its ends open, and an arcuate lubricant receptacle disposed loosely within the housing and adapted to fit a piston rod, valve stem, or the like, the receptacle having an aperture to allow the lubricant to flow onto the piston rod, valve stem, or the like, and the housing and receptacle having coöperating means whereby the receptacle is held within the housing.

5. A lubricator for piston rods, valve stems, and the like, embodying a lubricant receptacle having a curved portion to fit a piston rod, valve stem or equivalent member, said portion having a lubricant outlet normally closed by the piston rod or other member, and means for holding said receptacle in position upon the piston rod or other member whereby the receptacle can move slightly in various directions.

In testimony that I claim the foregoing as my own, I have hereto affixed my signature in the presence of two witnesses.

THOMAS SMITH.

Witnesses:
CHARLES E. CRANDALL,
LEO W. NEPHEW.

Copies of this patent may be obtained for five cents each, by addressing the "Commissioner of Patents, Washington, D. C."